(12) United States Patent
Motoiwa

(10) Patent No.: US 6,343,149 B1
(45) Date of Patent: Jan. 29, 2002

(54) DOCUMENT CHARACTER READING SYSTEM

(75) Inventor: Kouji Motoiwa, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/306,887

(22) Filed: May 7, 1999

(30) Foreign Application Priority Data

May 13, 1998 (JP) .......... 10-129842

(51) Int. Cl.[7] .......... G06K 9/03; G06K 9/62; H04N 1/387
(52) U.S. Cl. .......... 382/209; 382/311; 358/452
(58) Field of Search .......... 382/309, 310, 382/311, 321, 224, 227, 229, 209; 705/35, 42; 358/452

(56) References Cited

U.S. PATENT DOCUMENTS

| | | | | |
|---|---|---|---|---|
| 5,305,396 A | * | 4/1994 | Betts et al. ............. | 382/175 |
| 5,434,932 A | * | 7/1995 | Scott .................... | 382/309 |
| 5,555,325 A | * | 9/1996 | Burger .................. | 382/309 |
| 5,557,515 A | * | 9/1996 | Abbruzzese et al. ...... | 705/9 |
| 5,881,172 A | * | 3/1999 | Pintsov ................. | 382/227 |
| 5,992,752 A | * | 11/1999 | Wilz, Sr. et al. ....... | 235/472.01 |

OTHER PUBLICATIONS

Anegawa et al, "A System for Recognizing Numeric Strings from Topographic Maps"; IEEE Paper ISBN: 0–8186–7128–9, pp. 940–943, 1995.*

Tadanao Murayama et al. "OCR Application Systems for Financial Industry Information Systems". *Oki Denki Kenkyu Kaihatsu*, vol. 59, No. 4, pp. 23–26, 1992.

* cited by examiner

*Primary Examiner*—Amelia M. Au
*Assistant Examiner*—Mehrdad Dastouri
(74) *Attorney, Agent, or Firm*—Rabin & Berdo, P.C.

(57) ABSTRACT

A character reading system which reduces the amount of correction and verification work needed for a document for which characters have been correctly recognized. Whole image data WIMG of a document read by a remote OCR installed at a local station and first character data DATA1 recognized on the basis of a first character recognition method from this data WIMG are stored via a communication network in a memory component provided to a central station. A second recognition component provided to the central station recognizes second character data on the basis of a second character recognition method that is different from the first character recognition method from the image data WIMG read out from the memory component. A decision component decides whether there is a match between these first and second sets of character data. If there is a match, the data is outputted as correct character data, that is, third character data, to a host computer. If there is a mismatch, the data is changed to correct character data by a correction component, and, if needed, this correction is verified, after which the data is outputted as corrected correct character data to the host computer.

15 Claims, 9 Drawing Sheets

DOCUMENT CHARACTER READING SYSTEM

BACKGROUND OF THE INVENTION

1. Field of the Invention

The present invention relates to a character reading system for a document or the like, that verifies or corrects character information read from a document or the like and outputs the correct character information, and more particularly to a character reading system for a document or the like that verifies or corrects, at a central station, data related to the characters of a document or the like sent from a terminal through a communication line and outputs this data as correctly read character information.

2. Description of Related Art

In the past this type of character reading system was disclosed in the publication "OKI DENKI KENKYU KAIHATSU" Vol. 59, No. 4, pp. 23–26, 1992, "OCR Application Systems for Financial Industry Information Systems." FIG. 6 is a block diagram schematically illustrating an example of this conventional character reading system.

This system is a character reading system applied to a centralized exchange system for centrally managing exchange. This character reading system 10 comprises reading terminals 14 that read and output information pertaining to the characters of a document 12 or the like, and a central station 20 that centrally processes the information sent from the reading terminals 14 and outputs it as correctly read character information. Usually, the reading terminals 14 are installed at various remote local stations 16 such as "place of business," and are constituted by an OCR (hereinafter this OCR will be referred to as a remote OCR) or a facsimile device, for example. At the central station 20, the various information pertaining to characters sent from these reading terminals 14 via a communication line 18 is centrally processed and outputted as correct character information.

With the conventional structural example shown in FIG. 6, a remote OCR 14 for reading characters printed or recorded on a document 12, such as a bank transfer request, is installed at each local station 16. This remote OCR 14 is a device that reads the image data IMG of the document 12, converts this into character data DATA, and transmits the image data IMG and the character data DATA to the central station. The remote OCR 14 is connected to a communication network 18 such as an ISDN (Integrated Service Digital Network). Specifically, the character data include so-called "character" data and "numerical" data.

Meanwhile, the central station 20 is furnished with a storage device 22 for temporarily storing information, a correction terminal 24, a verification terminal 26, a gateway 28, a LAN 30 that is connected between these constituent elements 22, 24, 26, and 28 in order to allow information to be passed back and forth between these constituent elements, and a host computer 32 that is connected to the gateway 28. The correction terminal 24 and the verification terminal 26 are each constituted by a separate microcomputer. The storage device 22 is also controlled by a separate microcomputer.

The communication network 18 is connected to the storage device 22. This storage device 22 temporarily stores the image data IMG and character data DATA sent from the remote OCR 14 through the communication network 18 in order to correct and verify the character data.

The correction terminal 24 is used to decide whether or not the character data DATA stored in the storage device 22 is correct, and if the character data DATA is incorrect, an operator of this device corrects it. To this end, a conventional correction terminal 24 simultaneously displays on a monitor screen all of the image data IMG of the document 12 along with all of the character data DATA that has been read, including both correct character data and incorrect character data. The operator in charge of correction then makes a visual comparison of the image data with the various character data, and if an error is discovered in the character data, the operator uses the keyboard of the correction terminal 24 to change this incorrect character data to correct character data. The corrected character data DATA is transferred along with the image data IMG to the verification terminal 26 via the LAN 30.

The verification terminal 26 is a device that verifies that the correction has been properly carried out at the correction terminal 24. To this end, this verification terminal 26 simultaneously displays on a monitor screen all of the image data IMG of the document 12 along with all of the character data DATA that has been read, including both correct character data and incorrect character data, just as with the correction terminal 24. The operator in charge of verification then makes a visual comparison of the displayed character data and image data and decides whether the corrected character data is in fact correct. If it is decided that the corrected character data is correct, the operators uses the keyboard of the verification terminal to enter this, and the correct character data is sent to the gateway 28 via the LAN 30, and is outputted from the gateway 28 to the host computer 32.

Meanwhile, if it is decided at the verification terminal 26 that the character data is incorrect, this is entered by the operator using the keyboard of the verification terminal, and the image data IMG of the document 12 and the character data DATA are returned to the correction terminal 24 via the LAN 30.

With a conventional character reading system structured as above, the following operational steps are taken in order to output correct character data. Character data is recognized and read from image data by a single recognition on the basis of a certain character recognition method. Then, regardless of whether the character data that has been read is correct or not, all of the read character data is displayed along with the image data on the monitor screen of the correction terminal 24, and an operator looks at the character portion of the image data while making a direct visual comparison with the corresponding read character data, and decides whether the character data is correct. Next, after the incorrect character data has been corrected, the correct character data that was not corrected and the corrected character data are transferred along with the image data to the verification terminal 26, and these sets of data are simultaneously displayed on the monitor screen of the verification terminal 26. The operator again makes a direct visual comparison of all of the character data displayed on the monitor, and decides whether each set of character data is correct. Only when it has been decided that all of the character data displayed on the monitor screen of the verification terminal 26 is correct, the correct character data is outputted as read character data to the host computer 32 via the gateway 28.

However, accuracy has been improving for the character recognition itself of the document 12 or the like using OCR or the like. On the other hand, this has not led to a reduction in the correction and verification work that has to be performed by operators at the correction terminal 24 and the verification terminal 26. The reason for this is that since all of the read character data is displayed on the monitor screen, the operator has to decide the correctness of the character data and perform correction for the character data that needs correcting for all of the character data, regardless of whether correction is needed or not.

SUMMARY OF THE INVENTION

Therefore, an object of the present invention is to provide a character reading system for a document or the like with which the work of correcting and verifying character data read from a document or the like is reduced as much as possible.

The inventors pertaining to this application conducted various research and experimentation in an effort to achieve this object. First, the inventors focused on the fact that there is a variety of character recognition methods. For example, it is known that recognition algorithms for recognizing characters can be broadly grouped into pattern matching methods and structural analysis methods. There is also a variety of recognition methods among these pattern matching methods, depending on how the pattern is taken, how the dictionary is used, and so on. In view of this, it was thought that character recognition could be performed more reliably if two different character recognition methods were employed for a single recognition object. As a result, the inventors arrived at the conclusion that if the recognition of character data from image data were carried out individually by two different character recognition methods, a mutual comparison made of the character data sets obtained as a result, and the character data that matched in this comparison outputted directly as correct character data, then all of the read character data would not have to be displayed on the correction terminal and the verification terminal.

According to the first aspect of this invention, there is provided a character reading system in which first and second character data are separately read-out by two different character recognition methods, a decision is made as to whether the character data that has been read is correct by whether these first and second character data match or not, and correct character data is outputted just as it is, without being displayed on a correction terminal or verification terminal.

Therefore, this character reading system comprises: a first data reading component that reads image data from a recording medium such as a document in which the characters to be read are stored, recognizes first character data from the image data on the basis of a first character recognition method, and outputs this image data and first character data; a second data reading component that checks whether the above-mentioned first character data matches second character data recognized from the above-mentioned image data on the basis of a second character recognition method different from the above-mentioned first character recognition method, and outputs the above-mentioned first or second character data as correctly read character data if there is a match, but outputs the above-mentioned first or second character data as incorrect data if there is no match; a correction component having a display that receives and displays the above-mentioned image data and incorrect data, for correcting the above-mentioned incorrect data into correct character data while the operator compares the displayed image data and incorrect data; and a memory component that readably stores image data and first character data from the above-mentioned first data reading component, the above-mentioned second character data, and correct character data corrected as above.

With the constitution of the present invention, in the first and second data reading components, first and second data are respectively recognized and read, on the basis of mutually different character recognition methods, from image data that has been read from a single document. If there is a match between the first and second character data respectively read on the basis of mutually different character recognition methods, then the character data that is the result of this reading can be deemed to be correct character data. Accordingly, the correct character data for which the reading results have been deemed to be matching in the second data reading component is outputted as character data for the required post-processing without being sent to a correction component. If it is decided that the read first and second character data do not match in the second data reading component, this means that the first and/or the second character data is incorrect character data, so only in this case is the first or second character data sent to the correction component for the correction of the character data, and this incorrect character data is changed to correct character data at the correction component. Image data is displayed as an image on the monitor of the correction component, while the data to be corrected is displayed in a character font.

Thus, one of the two sets of character data is sent to the correction component as data to be corrected only when there is a mismatch between the first and second character data that have been individually read by two different character recognition methods for the same image data, and therefore the data to be corrected is the only data that is displayed simultaneously with the image data on the display component (monitor screen) of the correction component. Therefore, the operator only needs to compare the image display of the image data with the font display of character data that is the data to be corrected and to perform correction, verification, or the like for this data, so much less work is entailed by correction, verification, and the like than in the past.

In the implementation of the present invention, it is preferable for the first data reading component to be constituted by a document image data reading component and a first recognition component that recognizes character data as first character data from this image data on the basis of a first character recognition method. For example, it is good to use an OCR (Optical Character Reader) as the first data reading component. Each of the OCRs is separately installed as a reading terminal at each of remote local stations and may be coupled to a memory component at a central station through communication lines.

Alternatively, in the implementation of the present invention, the first data reading component may be constituted by a facsimile device as the image data reading component and an OCR as the first recognition component. In this case, a facsimile device is installed as a terminal at each local station, and an OCR is installed at the central station and linked to a memory component, allowing the OCR at the central station to be linked to these facsimile devices via communication lines.

Also, in the implementation of the present invention, it is good for the second data reading component to be constituted by a second recognition component that recognizes character data as second character data from image data on the basis of a second character recognition method, and a decision component that checks the first character data and second character data and decides whether the two sets of character data match or not. It is favorable, for example, for this second data reading component to be constituted by a second OCR.

It is also favorable for the memory component, the second recognition component, the decision component, the correction component, and, in some cases, the first recognition component to be linked together via a LAN. The verification component for verifying whether the corrected character data is correct or not may also be linked via this LAN as required. A gateway may also be linked via the LAN as needed, with this gateway linked to a host computer such that the uncorrected correct character data or the correct character data obtained by correction can be outputted to this host computer.

BRIEF DESCRIPTION OF THE DRAWINGS

The foregoing and other objects, features and advantages of the present invention will be better understood from the following description taken in connection with accompanying drawings, in which:

FIG. 3, including

FIG. 6 is a block diagram given to describe a conventional character reading system for a document or the like.

DESCRIPTION OF THE PREFERRED EMBODIMENTS

Figure 1:
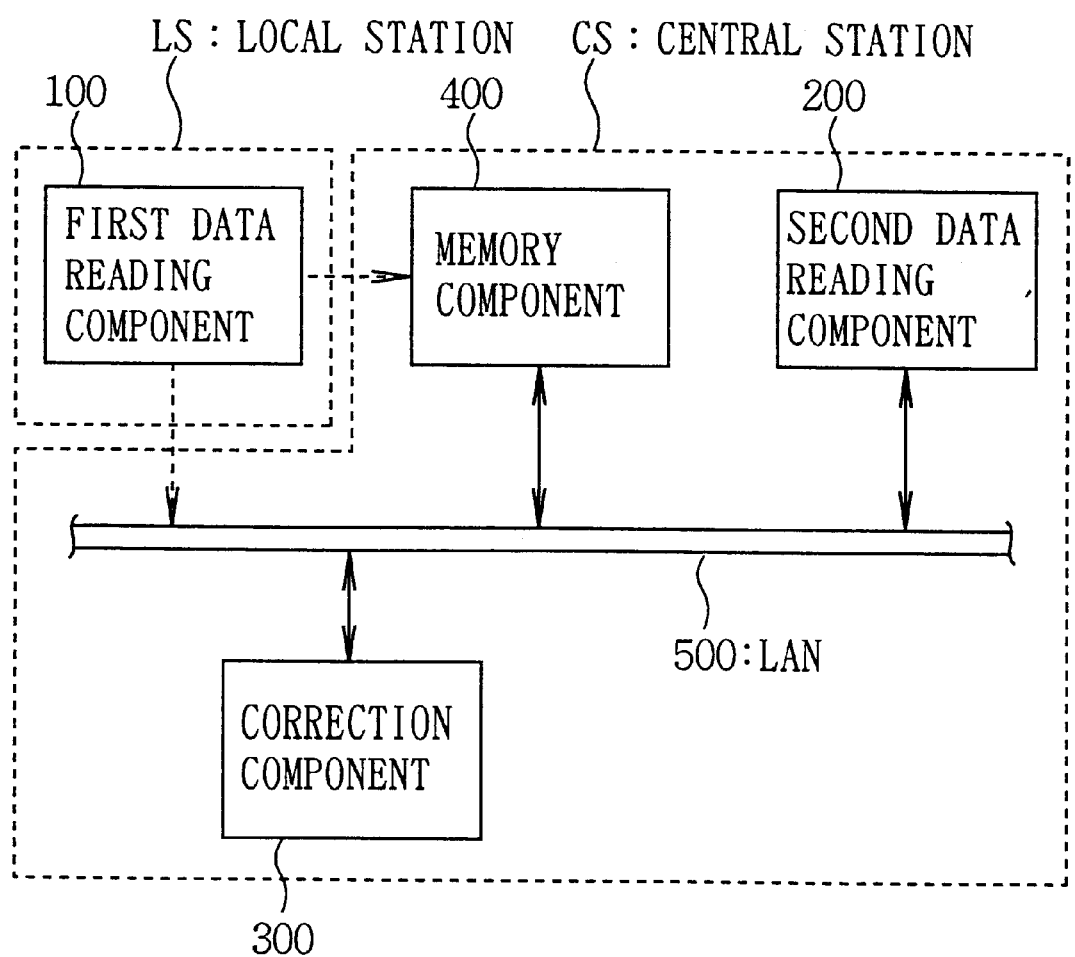
FIG. 1 is a block diagram illustrating a basic structural example of the character reading system for a document or the like of the present invention.

Embodiments of the character reading system for a document or the like of the present invention will now be described in detail through reference to the figures. FIG. 1 is a block diagram illustrating a basic structural example of the character reading system for a document or the like of the present invention.

This system basically comprises a first data reading component 100, a second data reading component 200, a correction component 300, and a memory component 400. These constituent elements 100, 200, 300, and 400 are linked together by a LAN 500. All or part of the constituent components of the first data reading component 100 are installed in a local station (place of business) LS at a remote site. The second data reading component 200, the correction component 300, and the memory component 400 are provided to a single common central station (central managing office). If needed, part of the first data reading component 100 may be provided inside this central station CS. There may be just one or a plurality of local stations LS, and the central station CS collectively manages these local stations. At least one first data reading component 100 is installed in each local station LS.

This first data reading component 100 reads image data and character data from a recording medium on which the character information that is to be recognized has been recorded, such as a document. Image data includes the whole image data WIMG in the reading region, and image data FIMG within a specific field of the reading region. The character data DATA is obtained by reading just the character portion from the field image data FIMG. The reading of this character data is performed on the basis of a first character recognition method, and this character data is termed the first character data DATA1. The character includes so-called character and figures such as numerals and symbols.

The first data reading component 100 installed at the local station LS generally operates independently of the central station CS to output read data. This first data reading component 100 is, for example, an OCR or a combination of an OCR and a facsimile device, as will be discussed below.

It is preferable, for example, for the second data reading component 200 and the memory component 400 to be constituted by parts of a common microcomputer, namely, the central processing unit (CPU) and memory, and for the operation thereof to be controlled by this microcomputer. If part of the first data reading component 100, such as an OCR, is provided within the central station CS, then it is preferable for the OCR that is a constituent part thereof to be controlled by this microcomputer as well.

This second data reading component 200 reads character data from the field image data FIMG on the basis of a second character recognition method that is different from the first character recognition method. The character data obtained here is termed the second character data DATA2. This second data reading component 200 compares the first character data DATA1 read by the first data reading component 100 with this second character data DATA2 and makes a decision as to whether the two match or not. If the two sets of character data match, then the recognized character data is outputted from the second data reading component 200 as correct character data DATA3. On the other hand, if the two sets of character data do not match, then either or both of the first and second character data is incorrect, that is, erroneous, character data, so the recognized first or second character data is outputted from the second data reading component 200 as data to be corrected. Alternatively, first character data is read out from the memory component 400 and sent to the correction component 300 by means of a mismatch signal.

Preferably, the correction component 300 is itself constituted by a microcomputer (monitor) equipped with input means and a display component (monitor screen), such as a work station. This correction component 300 receives the field image data FIMG and the data to be corrected, displays the field image data FIMG as an image on the monitor screen, and displays the data to be corrected in a character font on the monitor screen. The operator in charge of correction directly views and compares the displayed data to be corrected with the character data portion of the corresponding field image data FIMG. If this comparison results in a decision that the two displayed sets of data do not match, then the input means is operated to direct the correction of the data to be corrected. This directive causes the erroneous character font of the data to be corrected to be changed to correct character font and converted into correct character data DATA3.

The memory component 400 readably stores, either directly or via a LAN, the first character data DATA1 and the image data WIMG and FIMG from the first data reading component 100. This memory component 400 also readably stores the second character data DATA2 and the correct character data DATA3 that has been corrected.

The transfer of data between these first and second data reading components 100 and 200, the correction component 300, and the memory component 400 is performed via the LAN 500.

Next, two examples in which this character reading system is applied to an exchange centralized managing (or control) system will be described through reference to FIGS. 2 to 5.

Figure 2:
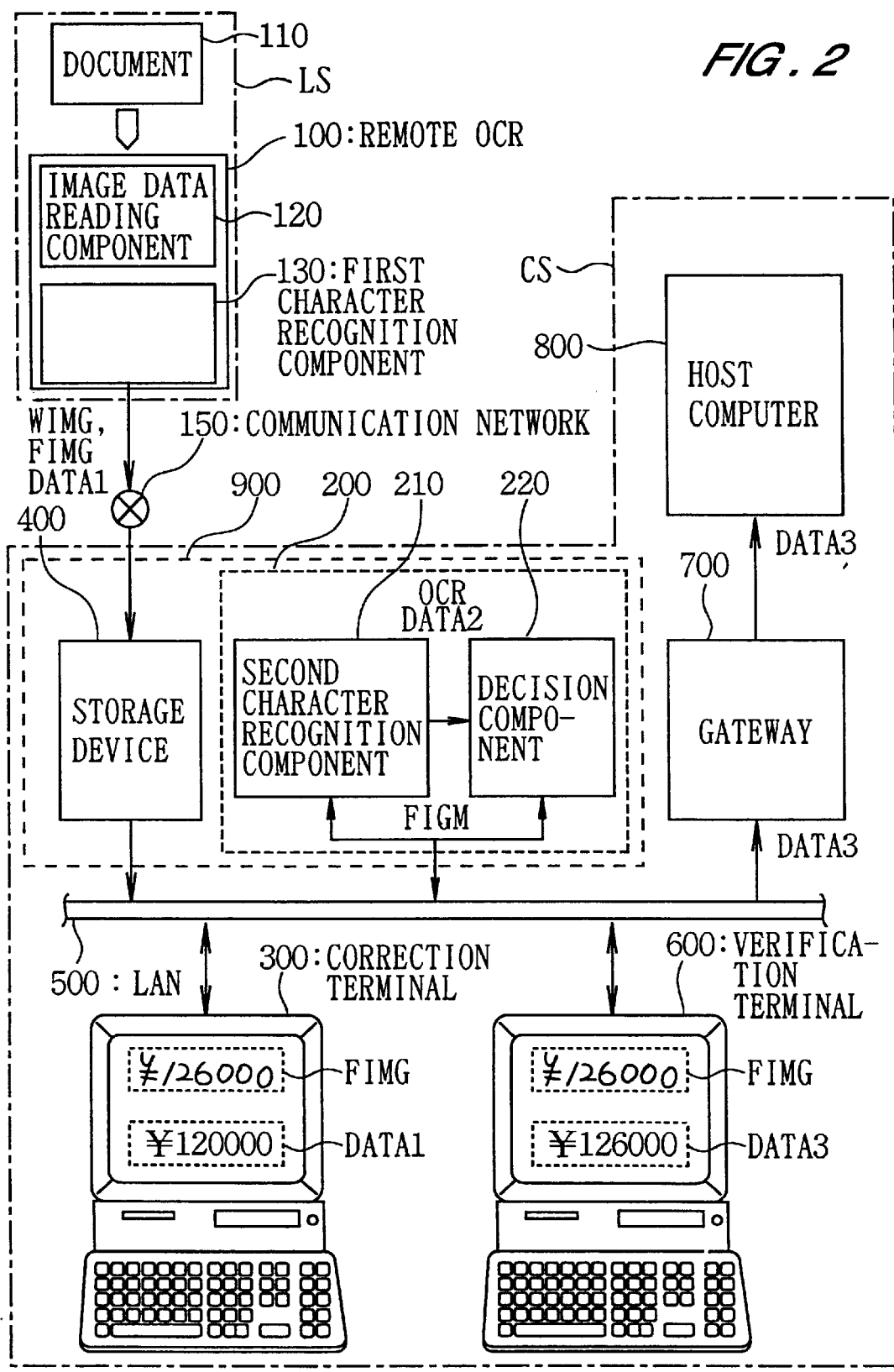
FIG. 2 is a block diagram of a first embodiment of the character reading system for a document or the like of the present invention.

First, the first example illustrated in FIG. 2 will be described. FIG. 2 is a block diagram of an embodiment of the character reading system for a document or the like of the present invention. This character reading system is an example of application to an exchange centralized managing system for the centralized managing of exchange. This system comprises a reading terminal installed on the local station LS side (namely, the first data reading component 100 for reading a document 110) and a central station CS that is linked to this terminal via an ISDN communication network 150 and performs centralized managing control. There may be a plurality of local stations LS, and a plurality of first data reading components 100 may be installed at a single local station.

In this example, the first data reading component 100 is constituted by an OCR (called a remote OCR). This remote OCR 100 has a conventional constitution, and comprises an image data reading component 120 and a first character recognition component 130. The image data reading component 120 reads from each document the image data WIMG within the whole to be read region, stored in or printed on the document, and extracts and reads from this image data WIMG the image data (field image data) FIMG within the field where the characters or symbols to be read are written. The first character recognition component 130 performs character recognition for this extracted field image data FIMG on the basis of a first character recognition method and outputs first character data. Any suitable means may be employed as this first character recognition method, such as a pattern matching process, a structural analysis process, or, among pattern matching processes, a process that uses a specific dictionary for recognition or a recognition process that involves taking a specific pattern. When the user puts the document 110 in the first data reading component 100, this reading component 100 automatically reads these image data WIMG and FIMG and first character data DATA1 and automatically sends these sets of data to the central station CS via the communication network 150.

With this example, the remote OCR 100 is linked via the communication network 150 to the memory component 400 inside the central station CS. As already explained, in the central station CS, this memory component 400 is linked via the LAN 500 with the second data reading component 200 and the correction component 300. In the example illustrated here, the memory component 400, the second data reading component 200, and the correction component 300 are linked via this LAN 500 such that a verification component 600 is able to exchange information. This verification component 600 is provided as needed. It is preferable for this verification component 600 to be constituted by a microcomputer (monitor) equipped with input means and display means (monitor screen), such as a work station. Further provided inside the central station CS is a host computer 800 for performing exchange managing processing on the correctly recognized character data DATA3. This host computer 800 is linked to the LAN 500 via a gateway 700.

At this central station CS, the above-mentioned memory component 400 readably stores all of these sets of information WIMG, FIMG, and DATA1 that have been sent through the communication network 150. Ordinarily, while the central station CS is in operation, this memory component 400 is always accessible from the second data reading component 200 in order to read out any of the information sets WIMG, FIMG, and DATA1.

The second data reading component 200 is constituted by an OCR of conventional structure. This OCR 200 comprises a second character recognition component 210 and a decision component 220. In the case of this example, the second character recognition component 210 performs character recognition on the basis of a second character recognition method for the field image data FIMG. This second character recognition method must be a different recognition process than the recognition process used by the first character recognition component 130. The character data read by this second character recognition component 210 is termed the second character data DATA2. This second character data DATA2 is sent to the memory component 400, and is also sent to the decision component 220. There are times when the character data cannot be recognized from the field image data FIMG by this second character recognition component 210. In this case, a signal to the effect that recognition is impossible is sent from the second character recognition component 210 to the decision component 220.

The decision component 220 receives the first character data DATA1 read out from the memory component 400 and the second character data DATA2 sent from the second character recognition component 210, and decides whether the two sets of character data DATA1 and DATA2 match or not. If this decision is that there is match between the two sets of character data, then these sets of character data DATA1 and DATA2 are deemed to be corrected character data. On the basis of this decision signal, the first character data from the memory component 400 is read out as correct reading data, that is, as the correct character data DATA3, and this data DATA3 is sent via the LAN 500 to the gateway 700, and then from this gateway 700 to the host computer 800. This series of steps is automatically performed by command from the control component (not shown) of a microcomputer 900 that constitutes the memory component 400 and the second data reading component 200.

Meanwhile, if the decision of the decision component 220 is that there is no match, then the memory component 400 is accessed from the control component (not shown) of the microcomputer 900 in response to this decision of a mismatch, the field image data FIMG and the first character data DATA1 are read out, and these sets of data are sent to the correction component 300. There may also be times when the characters recorded in the document 110 (see FIG. 2) cannot be read because the position where the characters were entered is wrong, for example. If the decision component 220 receives from the second character recognition component 210 a signal indicating that recognition is impossible, it reads the data from the memory component 400 and sends it to the correction component 300 along with this signal indicating that the characters are unreadable. In this case, the first character data DATA1 and the field image data FIMG may be sent to the correction component 300 from the memory component 400, or the first character data DATA1 and the image data WIMG may be read out and sent to the correction component 300.

In the above-mentioned case of a mismatch, the correction component 300 displays only two sets of data, namely, the field image data FIMG and the first character data DATA1, next to each other on the monitor screen. The person in charge of correction (the operator) compares the fonts of these two sets of data and finds which of the character fonts does not match. Since the character font of the field image data FIMG is correct, the erroneous character font of the first character data DATA1 is changed to the correct character font by keyboard operation.

When, as mentioned above, the correction component 300 receives a signal indicating that recognition is impossible in addition to the field image data FIMG and the first character data DATA1, the operator uses the keyboard to read out the image data WIMG from the memory component 400. This image data WIMG is rewritten as field image data FIMG in the correction component 300 and displayed on the monitor screen. The operator compares this image data WIMG with the first character data DATA1, and corrects and rewrites each character font of the first character data into the correct character font sequence.

It is clear that the operator does not need to read out the image data WIMG from the memory component 400 when the correction component 300 receives a signal indicating that recognition is impossible along with the image data WIMG and the first character data DATA1.

Thus, when the correction work is finished, correct character data, that is, the third character data DATA3, is stored in the memory component 400. As a result of the automatic access of the memory component 400 from the verification component 600, the third character data DATA3 and the field image data FIMG are sent to the verification component 600 via the LAN 500. The verification component 600 serves to verify whether the correction step has been properly carried out in the correction component 300. The verification component 600 displays only two sets of data, namely, the third character data DATA3 and the field image data FIMG, next to each other on the monitor screen. The person in charge of verification (the operator) compares the character fonts of third character data DATA3 and the field image data FIMG of the document 110 and verifies whether the two sets of data match. If the operator has verified that the two sets of data match, the operator uses the keyboard to input to the verification component 600 a command that the verification results are correct. In response to this command, a signal to read out the third character data DATA3 is sent from the verification component 600 to the memory component 400. In response to this read-out signal, the third character data DATA3 is outputted from the memory component 400 and transferred via the LAN 500 to the gateway 700. This third character data DATA3 is then sent from the gateway 700 to the host computer 800.

Meanwhile, in the verification component 600, if the operator has verified that there is an error, the operator sends a command from the verification component 600 by keyboard operation, and sends the field image data FIMG and the third character data DATA3 from the memory component 400 to the correction component 300. The same correction work as discussed above is repeated at this correction component 300. This repeated correction and verification is continued until the character correction is finally verified to be correct by the verification component and the third character data is sent to the host computer 800.

Figure 3A:
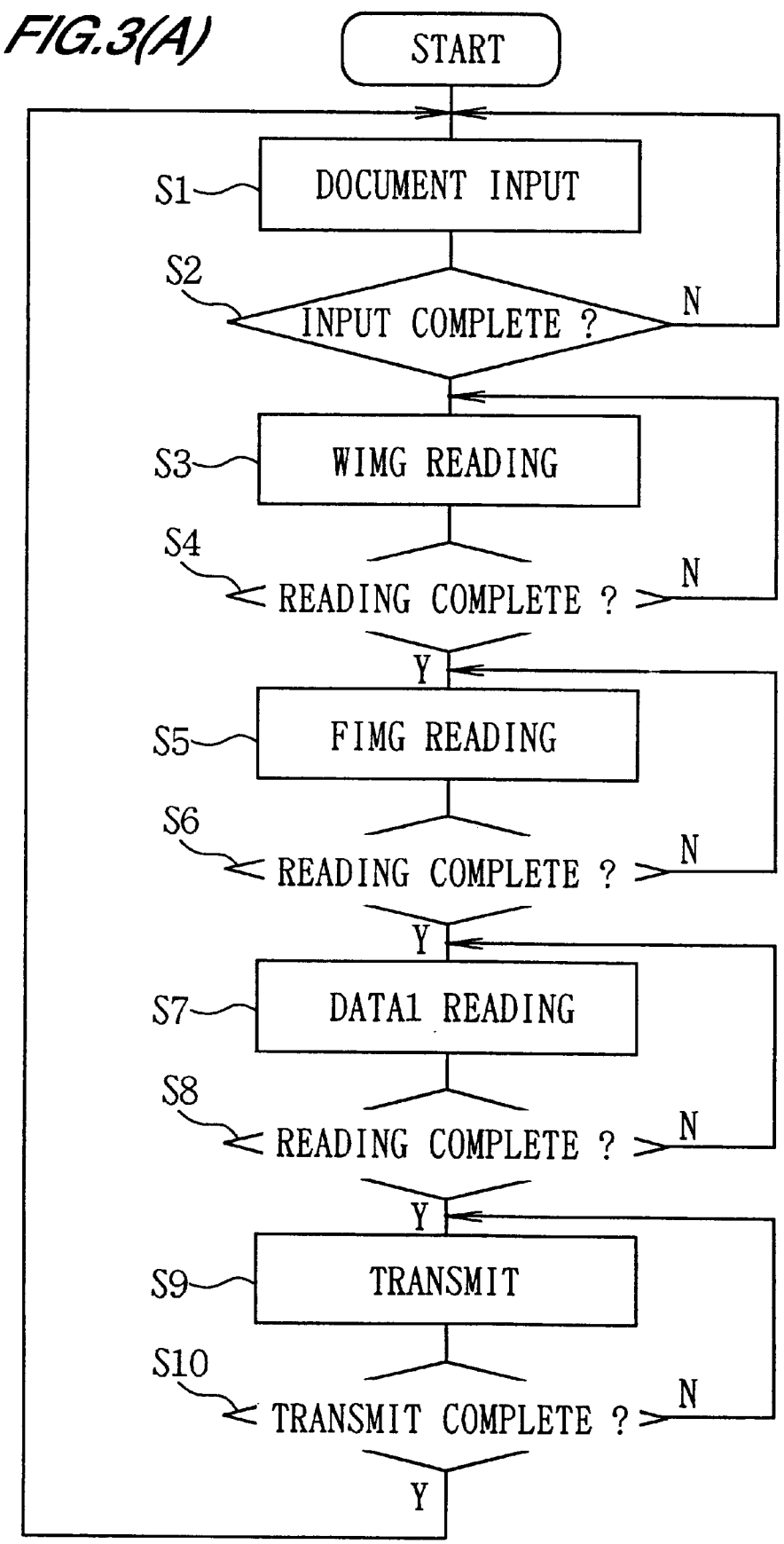
FIGS. 3(A) to 3(D), is operational flow charts given to describe the operation of the first embodiment of the present invention.
Figure 3B:
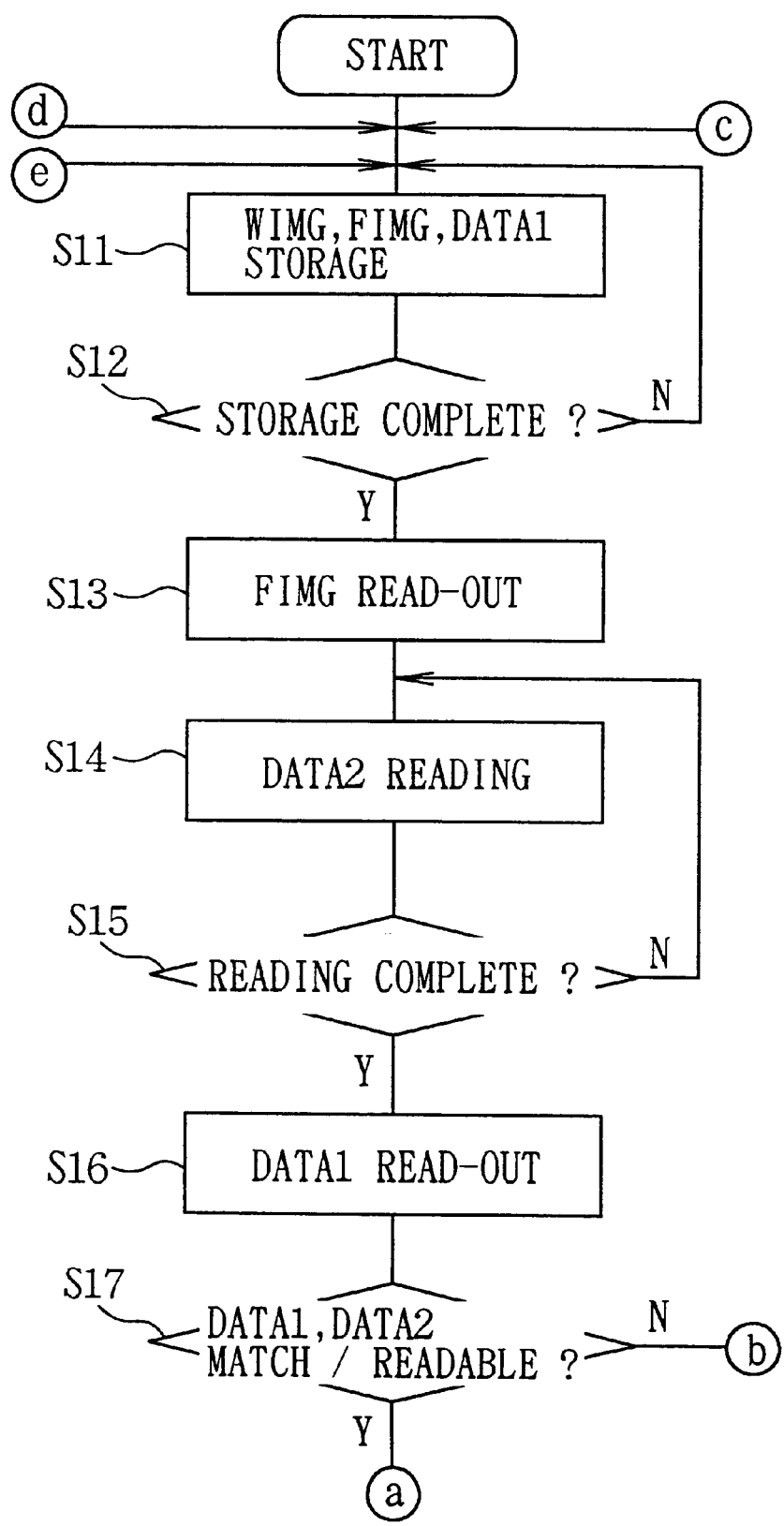
Figure 3C:
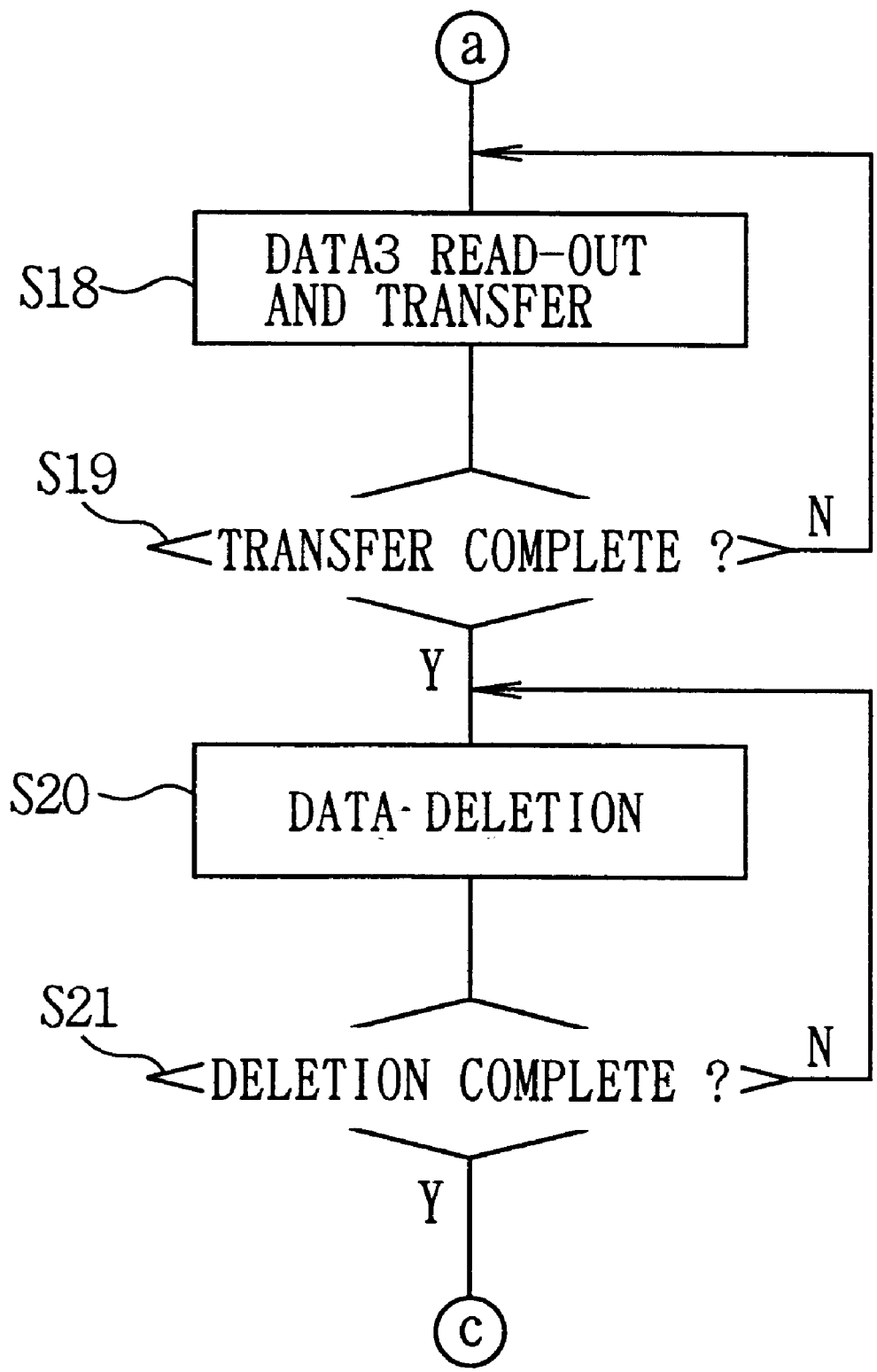
Figure 3D:
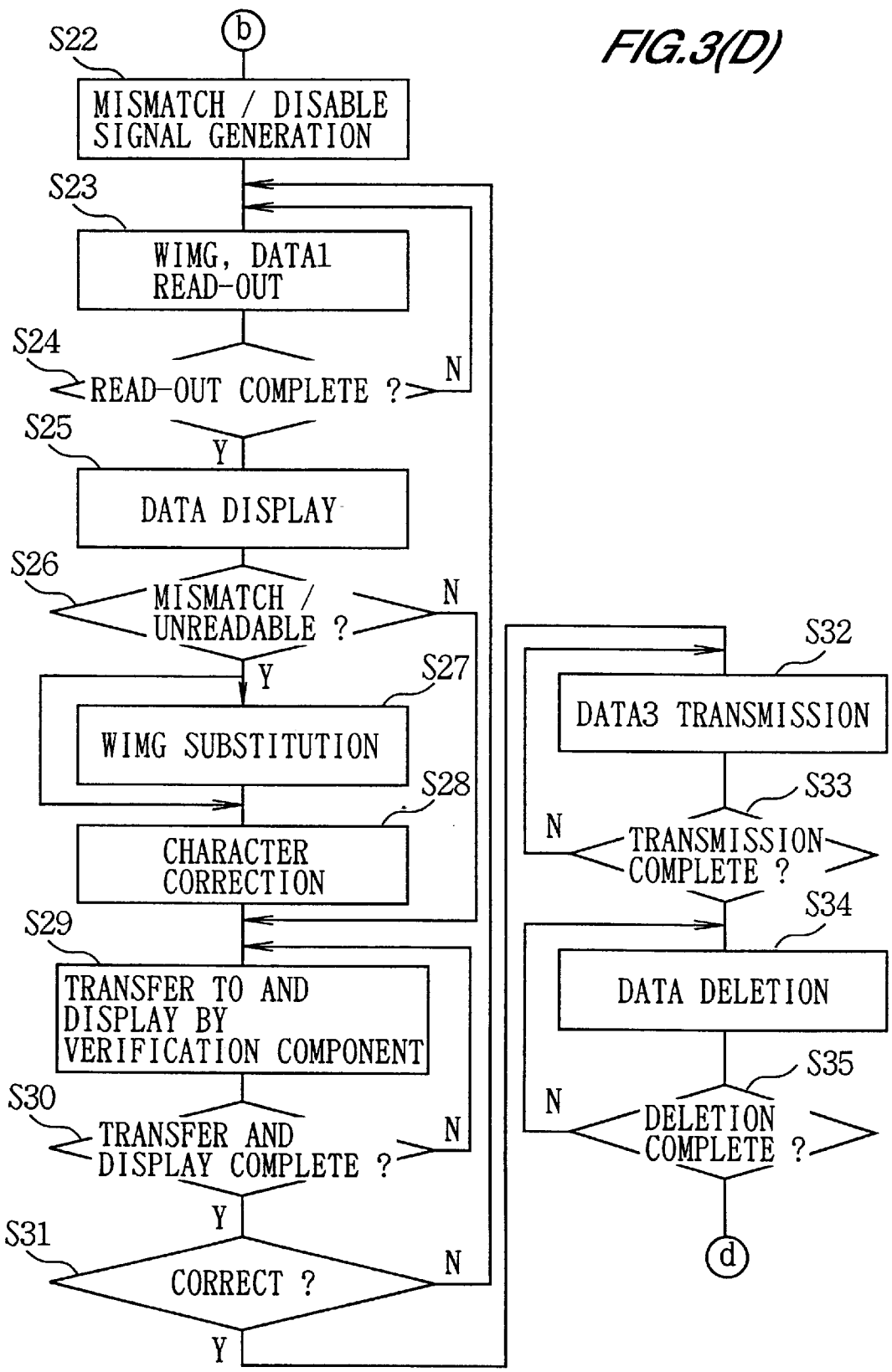

Next, the operation of the first embodiment of this present invention will be described through reference to FIGS. 2 and 3 (including FIGS. 3(A), 3(B), 3(C) and 3(D)). Let us assume that the local station LS and the central station CS are both in an operating state. First, the remote OCR 100 of the local station LS is operated as shown in FIG. 3(A). Specifically, when the document 110 to be read is inputted (Step: S1), the input of the document is confirmed (Step: S2), after which the whole image data WIMG is read in the image data reading component 120 (Step: S3). After this reading of the data WIMG has been confirmed (Step: S4), the field image data FIMG of the field in which the characters to be read have been written is read by extracting it from this data WIMG in the image data reading component 120 (Step: S5). After this extraction (reading) of the data FIMG has been confirmed (Step: S6), character recognition is performed for this field image data FIMG in the first character recognition component 130 on the basis of a first character recognition method, such as a recognition method that makes use of a special dictionary in a pattern matching process. As a result of this character recognition, the first character data DATA1 is read from this field image data FIMG (Step: S7). After the reading of this first character data has been confirmed (Step: S8), these data WIMG, FIMG, and DATA1 are transmitted from the remote OCR 100 to the memory component 400 of the central station CS via the communication network 150 (Step: S9). After the completion of this transmission has been confirmed (Step: S10), the same data reading operation is carried out for the next document.

Next, the operation of the central station CS will be described. The data WIMG, FIMG, and DATA1 transmitted from the local station LS are directly stored in the memory component 400 (Step: S11). This memory component 400 reads out data from the control component of the microcomputer 900 to the second OCR 200 (the second data reading component), and is therefore always accessible. Once it has been confirmed that the data WIMG, FIMG, and DATA1 have been store (Step: S12), the field image data FIMG is read out from the memory component 400 to the second character recognition component 210 of the second reading component 200 (Step: S13).

This character recognition by the second character recognition component 210 is performed on the basis of a second character recognition method that is different from the first character recognition method. For example, this is a pattern matching process in which a different dictionary is used. In this second character recognition component 210, character recognition is performed for the same characters as were recognized by the first character recognition component 130 from the field image data FIMG, the second character data DATA2 is read, and the second character data is outputted to the decision component 220 in the next stage (Step: S14). Alternatively, information as to whether either or both of the first and second character data is unreadable by the second character recognition component 210 is sent to the decision component 220 (Step: S14). After the completion of this reading of the second character data has been confirmed (Step: S15), the first character data DATA1 is read out from the memory component 400 and inputted to the decision component 220 by a command from the control component of the microcomputer 900 (Step: S16).

This decision component 220 performs a comparison of the first and second character data DATA1 and DATA2 and decides whether the two sets of data match or not (Step: S17). The decision as to the matching of the two sets of data can be made by a suitable method according to a conventional design.

If it is decided that the first and second character data DATA1 and DATA2 match (Step: S17), this match signal is sent to the memory component 400, and the first character data DATA1 is read out from the memory component 400 as correct reading data DATA3 (third character data), transferred to the gateway 700 via the LAN 500, and then sent to the host computer 800 (Step: S18). In response to the completed transfer of this third character data DATA3 (Step: S19), a delete signal is sent from the control component of the microcomputer 900 to the memory component 400, and the data WIMG, FIMG, DATA1, and DATA2 of the document 110 stored in the memory component 400 are deleted (Step: S20). After the completion of this data deletion (Step: S21), the system goes into a standby mode for storing data related to the next document.

Meanwhile, when it has been decided in the decision component 220 that the two sets of data DATA1 and DATA2 do not match, or when it has been confirmed that the field image data FIMG is unreadable, the decision component 220 produces a signal to the effect that there is a mismatch or reading is impossible (Step: S22). In response to this signal, the image data WIMG and the first character data DATA1 are read out as data to be corrected by accessing the memory component 400 from the control component of the microcomputer 900 (Step: S23), and these data WIMG and DATA1 are sent to the correction component 300 via the LAN 500.

Upon completion of the read-out of these data (Step: S24), the data WIMG and DATA1 are displayed next to each other on the monitor screen of the correction component 300 (Step: S25). In this case, as shown in FIG. 2, for example, the field image data FIMG read from the reading field of the document 110 is displayed directly as image information. Let us assume that this image information is "¥126000." Meanwhile, a character font based on the corresponding first character data DATA1 is displayed for comparison. Let us assume that this first character data is displayed as "¥120000," for example. The operator compares the displayed characters of the two sets of data (Step: S26).

The operator compares the displayed field image data FIMG with the first character data DATA1 one character at a time to find which character(s) is wrong (Step: S26). If it is found that a certain character of the first character data is wrong (Step: S26), then that character is corrected (Step: S28). This correction involves operating the keyboard to correct just the erroneous character while looking at the monitor screen. The operator performs the correction for the erroneous character of the first character data by keyboard operation. For instance, in the illustrated case of character data of "¥120000," the numeral "0" of the fourth character font from the right is corrected to the numeral "6".

Meanwhile, when reading is impossible (Step: S26), the operator operates the keyboard to access the memory component 400 via the LAN 500 and reads out the whole image data WIMG of the document 110 (Step: S27). This image data WIMG is then inputted to the correction component 300, and the field image data FIMG is replaced with the whole image data WIMG and displayed (Step: S27). This image data WIMG is displayed as image information, such as image information including "¥126000" and anything in the vicinity thereof. The operator looks at the characters in this whole image information and uses the keyboard to write and display the correct character data DATA3 to the correction component 300 and correct the character (Step: S28).

The correct character data DATA3 obtained by correction in this manner is transferred from the correction component 300 via the LAN 500 and stored in the memory component 400 by keyboard operation by the operator upon completion of the correction, and is transferred to the verification component 600 along with the image data FIMG (Step: 29). The correct character data DATA3 and the image data FIMG are displayed for comparison on the monitor screen of the verification component 600.

If, in the decision-making of the above-mentioned correction step (Step: S26), the operator decides that the first character data DATA1 is not wrong (that is, if there is a match or the character data is readable), then the operator uses the keyboard to input a signal indicating that the characters are correct, and accesses the memory component 400 for this signal via the LAN 500. As a result of this access, the first character data DATA1 is read out from the memory component 400 as the third character data DATA3, and this third character data DATA3 is transferred to and displayed as correct character data at the verification terminal 600 along with the image data FIMG via the LAN 500 (Step: S29).

After it has been confirmed that the image data FIMG and the third character data DATA3 have been transferred to the verification component 600 (Step: S30), the operator of the verification component 600 decides whether the image data FIMG matches the third character data DATA3 (Step: S31). In this decision, if, for example, FIMG is "¥126000" and the third character data DATA3 is also "¥126000," then this third character data is deemed to be correct. When it is thus decided that the character data is correct, only the third character data DATA3 of the document 110 is transferred to the gateway 700 via the LAN 500, and is then transmitted from the gateway 700 to the host computer 800 (Step: S32).

Once it has been confirmed that the transmission of the third character data DATA3 is complete (Step: S33), the whole image data WIMG, the field image data FIMG, and the first character data DATA1 of the document 110 stored in the memory component 400 are deleted by a command from the control component of the microcomputer 900 (Step: S34). Upon confirmation of this deletion (Step: S35), the memory component 400 returns to step S11 for storing the data of the next document.

If the decision of the operator is "erroneous" in this verification decision step (Step: S31), then a command is issued by keyboard operation to return to step S23. The correction process from step S23 to step S31 is then repeated. When it is finally decided that the characters have been read correctly (Step: S31), the subsequent steps S32 to S35 are carried out in the same manner as above.

As is clear from the above description, the character reading system of this first embodiment is equipped with a second character recognition component 210 that reads the characters by a different character recognition method than that used by the first character recognition component 130 of the remote OCR 100. This decision component 220 compares the first character data DATA1 read by the remote OCR 100 with the second character data DATA2 read by the second character recognition component 210, and considers the reading to be correct if the two sets of data match. The correct character data is immediately transmitted as the third character data DATA3 to the host computer 800 via the gateway 700. Accordingly, the first character data DATA1 of the document 110 that has been correctly read does not have to be checked at the correction component 300 or the verification component 600, so the operator performs much less correction and verification work.

Figure 4:
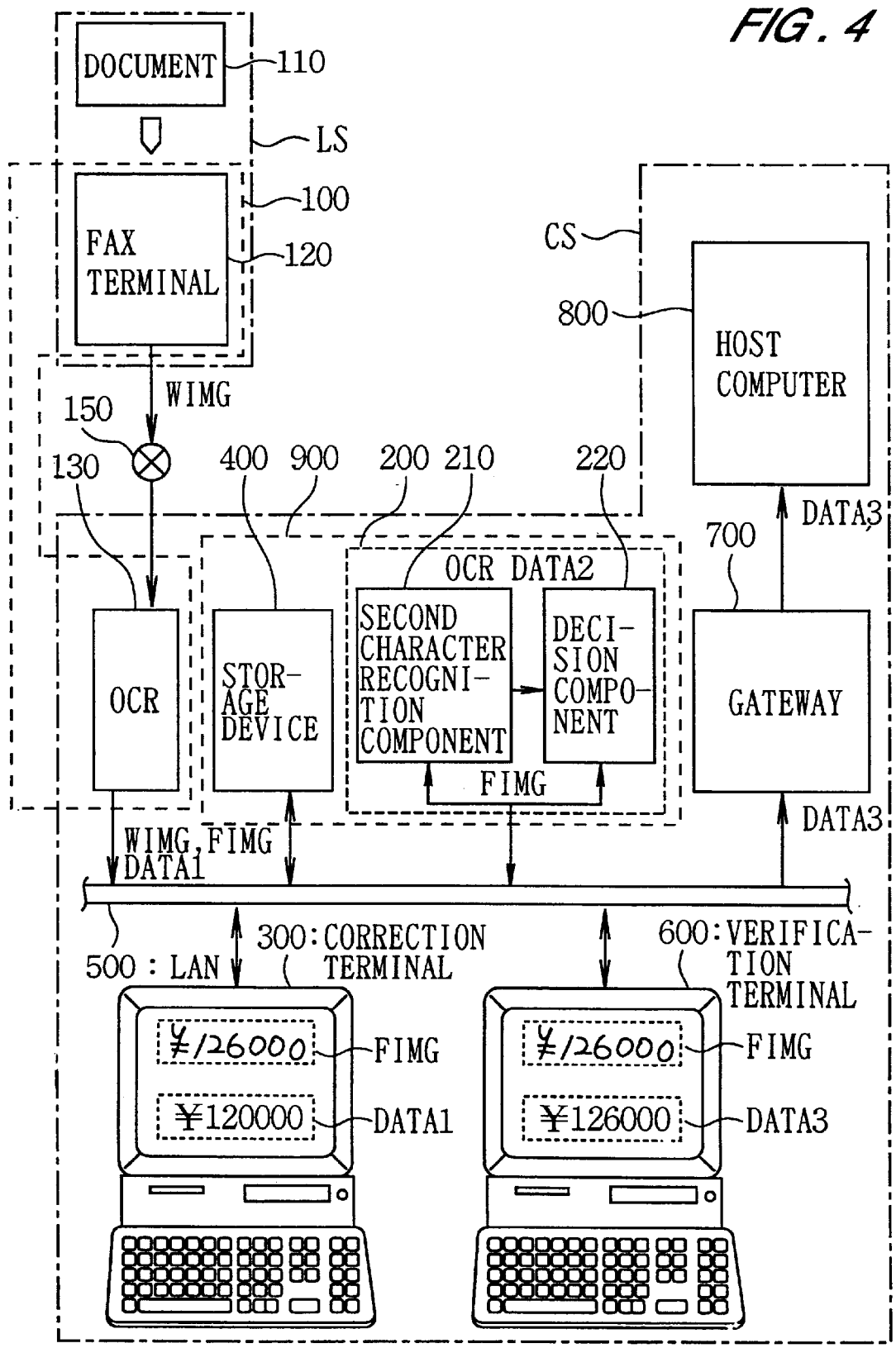
FIG. 4 is a block diagram illustrating a second embodiment of the character reading system for a document or the like of the present invention.
Figure 5:
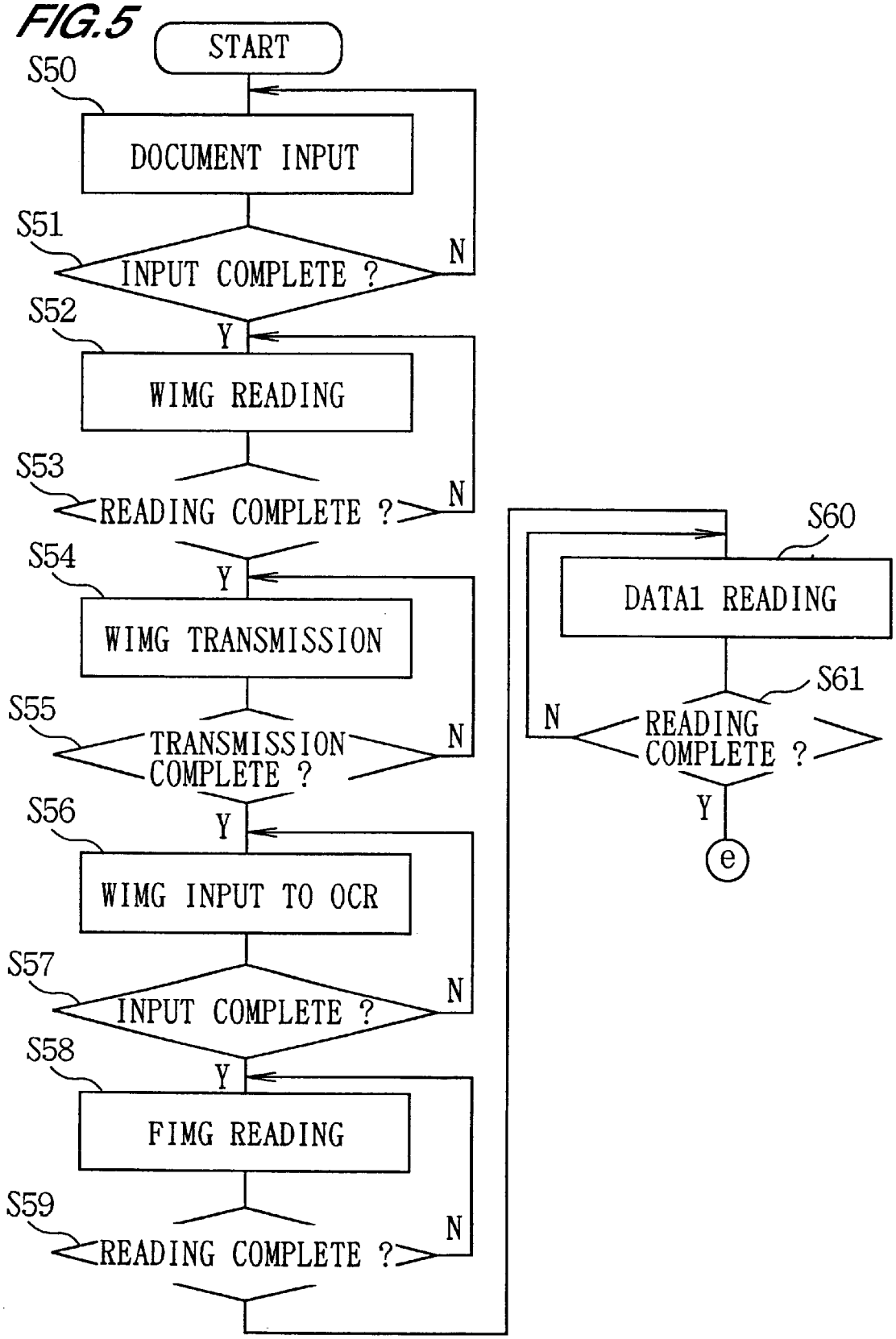
FIG. 5 is an operational flow chart given to describe the operation of the second embodiment of the character reading system for a document or the like of the present invention.
Figure 6:
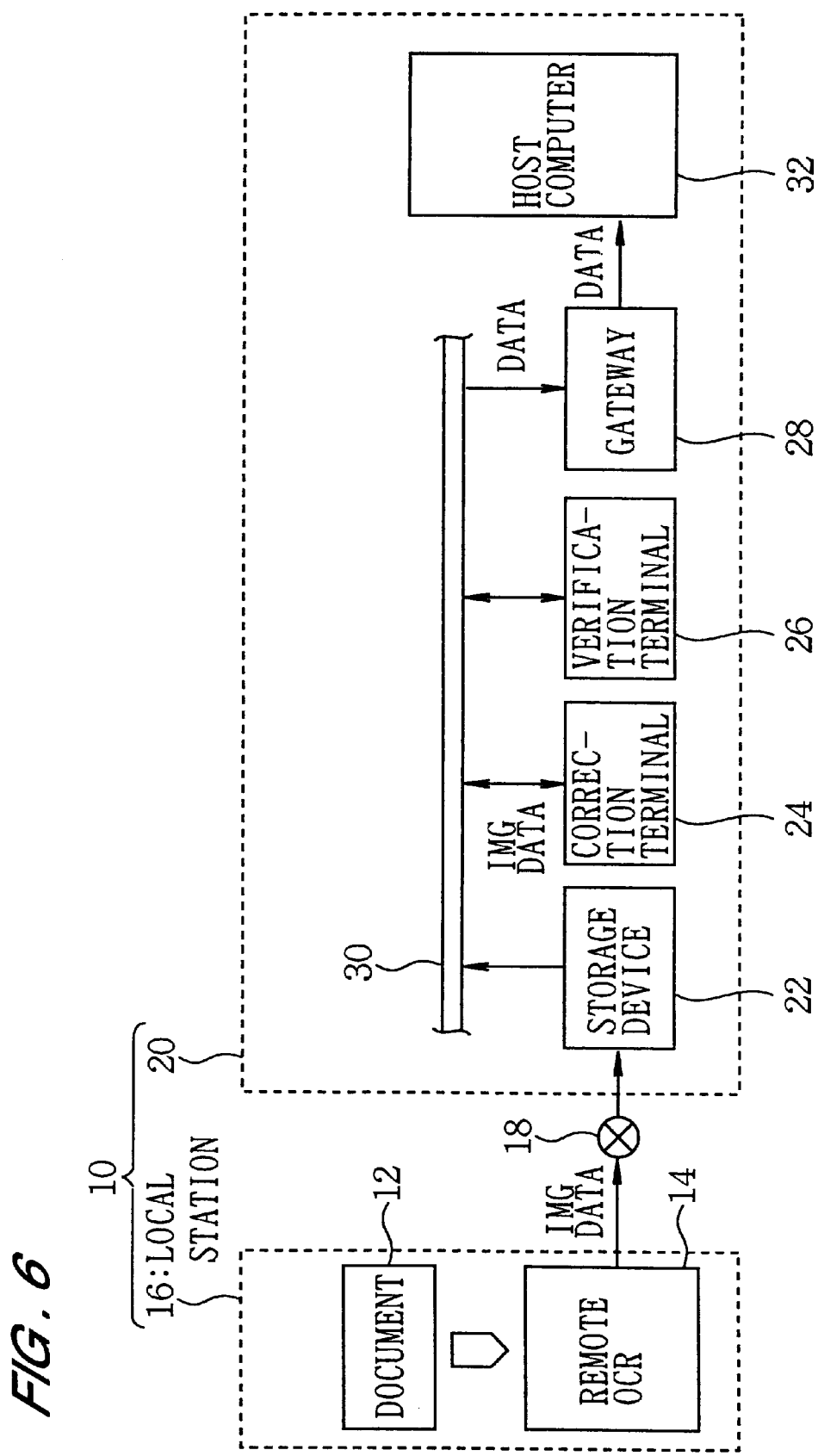

Next, a second embodiment of the document character reading system of the present invention will be described through reference to FIGS. 4 and 5. The constitution of this second embodiment only differs from the constitution of the first embodiment described above in the first data reading component. The rest of the constitution of this document character reading system is the same as the constitution of the first embodiment described through reference to FIG. 2, so the detailed description thereof will be omitted unless specifically necessary.

With the second embodiment, the first data reading component 100 comprises a facsimile device (FAX terminal) 120 as the image data reading component and an OCR 130 as the first character recognition component. In the case of this second embodiment, only the facsimile device 120 is installed at the local station LS, and the OCR 130 is provided at the central station CS.

When the document 110 is inputted (Step: S50), once the completion of this input has been confirmed (Step: S51), the facsimile device 120 reads the whole image data WIMG (Step: S52). Upon confirmation of this reading (Step: S53), the read image data WIMG is transmitted via the communication network 150 to the OCR 130 of the central station CS (Step: S54), and this transmission is confirmed (Step: S55).

As a result of this transmission, the whole image data WIMG is inputted to the OCR 130 (Step: S56). This OCR 130 extracts from among the whole image data WIMG of the document 110 an image within the field in which are written the characters to be read, that is, the field image data FIMG (Step: S58). After this extraction, that is, reading is complete (Step: S59), this extracted field image data FIMG is read by recognizing the first character data DATA1 on the basis of any suitable first character recognition method (Step: S60).

The first character data DATA1 converted by this extraction is stored in the memory component 400 together with the above-mentioned image data WIMG and the field image data FIMG. Again in this second embodiment, this storage and the subsequent series of character reading steps are carried out according to the procedure described for FIGS. 3(A) to 3(D).

Specifically, the image data WIMG, FIMG, and DATA1 are transferred from the OCR 130 via the LAN 500 to the memory component 400, where they are temporarily stored. A decision is then made from the field image data FIMG as to whether the first character data DATA1 matches the second character data DATA2 read by any suitable second character recognition method that is different from the first character recognition method.

Just as in the first embodiment, if the result of this decision is a mismatch, then the correct character data (third character data) DATA3 is sent to the host computer 800 after the correction and verification steps have been finished. Alternatively, if the decision is a match, then the correct character data (third character data) DATA3 is sent directly to the host computer 800, without first going through the correction and verification steps.

Thus, with this second embodiment, the facsimile device (terminal) 120 is installed at the local station LS, and the OCR 130 is provided to the central station CS. With this constitution, in addition to the advantages obtained with the constitution of the first embodiment, the equipment at numerous local stations can be simplified without increasing the equipment at the central station that much, so the cost of the overall system can be reduced.

The present invention is not limited to the first and second embodiments given above, and it will be clear to a person skilled in the art that various changes and modification can be made. For instance, variation examples (a) to (d) given below can be implemented favorably.

(a) The number of fields in which the characters to be read in the document 110 is not limited to one, and there may be a plurality instead. If there are a plurality of fields, then the correction and verification work can be omitted when the first and second character data DATA1 and DATA2 of all the fields all match. If a mismatch is found in some of the fields, then the correction and verification work need only be performed for those mismatched fields. Thus, correction and verification work can be greatly reduced with the character reading system of the present invention as compared to the past.

(b) With the centralized exchange system described in the first and second embodiments, a double-check was performed using the correction terminal (correction component) 300 and the verification terminal (verification component) 600, but the verification terminal may be omitted with some systems.

(c) The remote OCR 100 of the first embodiment illustrated in FIG. 2 is constituted such that the field image data FIMG and the first character data DATA1 are transmitted to the central station CS along with the whole image data WIMG of the document 110. However, the extraction of the field image data FIMG from the whole image data WIMG and the recognition of the first character data may be performed, for example, by the OCR 200 (the second data reading component). In this case, there is no need to transmit the data FIMG via the communication network 150.

(d) The memory component 400, the correction component 300, the verification component 600, the gateway 700, the OCR 200, and so on of the central station CS are connected via the LAN 500, but another option is to configure the system from a single computer system having these functions.

With the document character reading system of the present invention, the first character data recognized by a first character recognition method in the first character data reading component is compared with the second character data recognized by a second character recognition method that is different from the first character recognition method in a second character data reading component, and a decision is made as to whether the two sets of data match or not. If the two sets of data do match, then they are outputted directly as correct character data, and no correction or verification is performed on this correct character data. Therefore, correction by an operator is only needed when the first and second character data do not match, so the operator has to perform less checking work than in the past.

Also, the first reading component that constitutes the document character reading system of the present invention may be constituted by a facsimile device (terminal device) that reads the whole image data of the document on the local station side, and a first recognition component that recognizes the first character data by a first character recognition method on the basis of the image data sent from this facsimile device. In this case, the facsimile device may be installed at the local station and the first recognition component at the central station, so a single, common recognition component may be used for a plurality of facsimile devices provided to various local stations. Accordingly, the cost of the overall system when numerous reading devices are dispersed over the entire system can be much lower than in the past.

What is claimed is:

1. A document character reading system, comprising:
a first data reading component that reads image data from a recording medium such as a document in which the characters to be read are stored, recognizes first character data from said image data on the basis of a first character recognition method, and outputs said image data and first character data;
a second data reading component that checks whether said first character data matches second character data recognized from said image data on the basis of a second character recognition method different from said first character recognition method, and outputs said character data as correctly read character data if there is a match, but outputs said first or second character data as incorrect data if there is no match;
a correction component having a display that receives said image data and incorrect data, and displays said image data as an image and said incorrect data in a character font, for correcting said incorrect data into correct character data while the operator compares the displayed image data and incorrect data;

a memory component that readably stores image data and first character data from said first data reading component, said second character data, and said correct character data;

wherein said image data comprises the whole image data of said document and field image data extracted from images within fields where the characters to be read are written; and wherein said first character data and second character data are recognized from said field image data.

2. The document character reading system according to claim 1, wherein said first data reading component comprises a document image data reading component and a first recognition component that recognizes character data as first character data from this first character recognition method.

3. The document character reading system according to claim 1, wherein said first data reading component comprises a facsimile device as the image data reading component and an OCR as the first recognition component.

4. The document character reading system according to claim 1, wherein said second data reading component comprises a second recognition component that recognizes character data as second character data from image data on the basis of a second character recognition method, and a decision component that checks said first character data and second character data and decides whether the two sets of character data match or not.

5. The document character reading system according to claim 4, wherein said memory component, said second recognition component, said decision component, said correction component, and said first recognition component are linked together via a LAN.

6. The document character reading system according to claim 2, wherein said first data reading component is installed at a local station.

7. The document character reading system according to claim 3, wherein said facsimile device is installed at a local station, and said first recognition component is installed at a central station.

8. The document character reading system according to claim 1, wherein said first data reading component and said memory component are connected via a communication network.

9. The document character reading system according to claim 3, wherein said facsimile device and said first recognition component are connected via a communication network.

10. The document character reading system according to claim 1, wherein said first data reading component comprises an OCR.

11. The document character reading system according to claim 1, wherein said second data reading component comprises an OCR.

12. The document character reading system according to claim 11, wherein said first data reading component comprises a document image data reading component and a first recognition component that recognizes character data as first character data from this image data on the basis of a first character recognition method, said first recognition component being included in said OCR in said second data reading component.

13. The document character reading system according to claim 5, wherein a gateway is connected to said LAN, and a host computer is connected to said gateway.

14. The document character reading system according to claim 5, further comprising a verification component connected to said LAN for verifying the character data corrected by said correction component through comparison with said image data.

15. The document character reading system according to claim 2, wherein said second data reading component includes a second recognition component that recognizes character data as second character data from image data on the basis of a second character recognition method, and a decision component that checks said first character data and second character data and decides whether the two sets of character data match or not, wherein said memory component, said first recognition component, said second recognition component, said decision component, and said correction component are linked together via a LAN.

* * * * *